Aug. 13, 1946.  E. H. SHAFF  2,405,613
APPARATUS FOR SETTING BLIND RIVETS
Original Filed Nov. 5, 1942
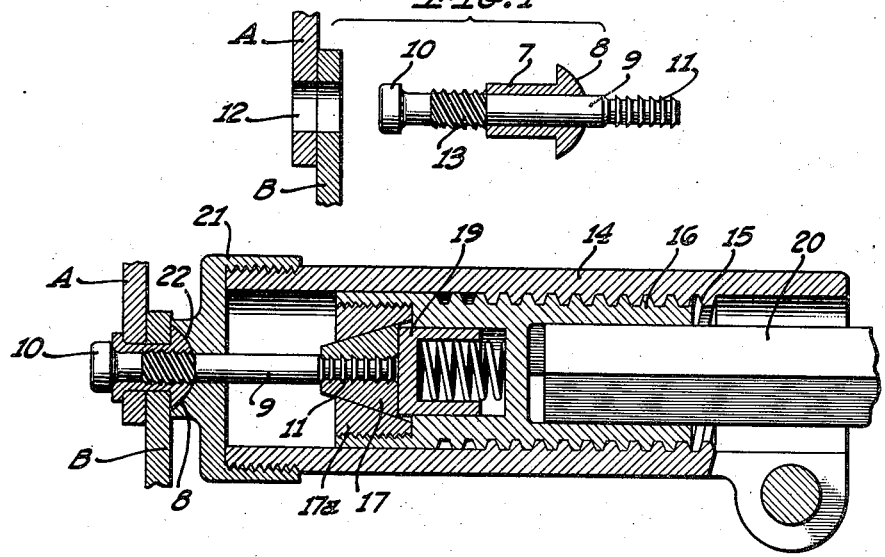
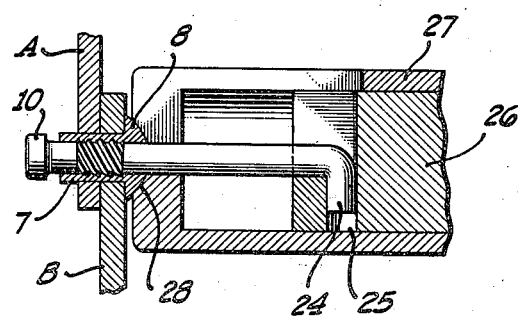
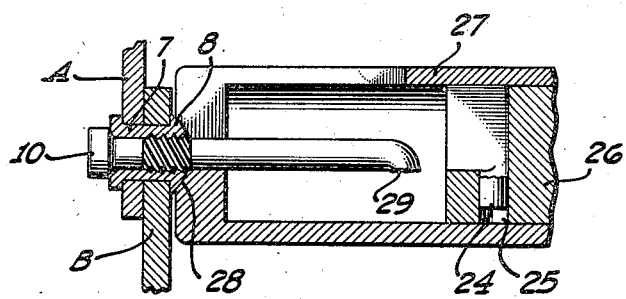
INVENTOR.
ERNEST H. SHAFF,
BY
ATTORNEY.

Patented Aug. 13, 1946

2,405,613

UNITED STATES PATENT OFFICE 2,405,613

APPARATUS FOR SETTING BLIND RIVETS

Ernest H. Shaff, Spring Lake, Mich., assignor to Cherry Rivet Company, Los Angeles, Calif., a corporation of California Original application November 5, 1942, Serial No. 464,677. Divided and this application April 30, 1945, Serial No. 591,039

3 Claims. (Cl. 218—19)

1

This invention relates to blind rivets and has particular reference to apparatus for setting blind rivets of the type in which the rivet setting stem or mandrel is provided with helical threads adapted to cut corresponding threads in the rivet body as the stem is drawn through the rivet in the rivet setting operation.

This application is a division of my copending application Serial No. 464,677, filed November 5, 1942, now Patent Number 2,385,886, granted Oct. 2, 1945, which describes and claims a rivet of the character set forth above.

In my copending application Serial No. 464,677 noted above, there is described and illustrated a form of blind rivet which comprises a hollow rivet body adapted to be inserted into rivet holes in sheets, or other devices to which the rivet is to be attached, with a stem extending through the rivet body including a portion comprising a forming head, immediately adjacent to which the stem is provided with one or more helical threads extending outwardly from the body of the stem and adapted, when the stem is drawn inwardly of the rivet body and partially rotated, to cut corresponding threads in the rivet body while at the same time expanding the rivet body radially to perform the triple function of enlarging the rivet body radially to insure tight fit within the rivet holes, upsetting the inner end of the rivet body to hold the rivet securely in place, and to threadedly engage the stem and rivet body to insure retention of the stem within the deformed rivet body.

It is an object of this invention to provide an apparatus by which the rivet stem may be given the necessary axial pull and rotary motion to properly set a rivet of the type described and claimed in the above noted application.

Another object of my invention is to provide apparatus by which the stem of a rivet of the character described may be drawn axially relative to the rivet body and simultaneously given the rotational movement necessary to set the rivet.

Another object of this invention is to provide an apparatus of the character described in the preceding paragraph wherein the axial and rotary motions are so coordinated with each other as to conform with the pitch of the threads on the rivet stem.

Other objects and advantages of my invention will be apparent from a study of the following specification, read in connection with the accompanying drawing, wherein Fig. 1 is a longitudinal sectional view through a tubular rivet and showing its cooperating forming member in elevation, the assembly being further shown in connection with the parts to be fastened together;

Fig. 2 is a fragmentary longitudinal sectional view illustrating the method and means for applying the rivet;

Fig. 3 is a fragmentary longitudinal sectional view of the improved rivet with its forming stem modified for cooperation with a slightly different form of tool; and Fig. 4 is a similar view but showing the relation of the parts after the rivet has been set.

The rivet assembly comprises two principal parts, namely, the rivet proper or rivet body and its forming stem. The rivet proper consists of a tubular shank 7 having a head 8 at its outer end. The shank 7 has a smooth axial bore through which is inserted a forming stem 9 having at its inner end a forming head 10 and at its outer end a section 11 specially constructed to permit of a firm gripping action on the stem. The head 10 is of a diameter adapted to be entered through registering holes 12 in two plates or parts A and B which are to be fastened together.

The forming stem 9 is provided near the head 10 with a portion 13 of an external diameter somewhat larger than the internal diameter of the rivet bore and having one or more radially extending helical ribs or threads formed thereon and operative when the forming stem is withdrawn axially through the shank 7 to exert a radial expansive force upon the shank which serves not only to bind the forming stem in the shank but also to expand the latter into engagement with the edges of the holes 12 of the parts A and B.

In the operation of upsetting the inner end of the tubular shank 7, a combined axial and rotational movement is imparted to the forming stem 9. As will be seen from a comparison of Figs. 1 and 2, the helically threaded portion 13 is in this operation first moved into intimate binding engagement with the rivet shank 7, and upon engagement between the forming head 10 of the stem and the inner end of the shank 7 the continued rotational and axial movement imparted to the forming stem causes the helically threaded portion 13 to continue its movement with a screw feed during the upsetting operation. As a result, the upsetting is performed not only because of an axial movement imparted to the stem but by a rotary screw threading action substantially augmenting the force required to be applied axially to perform the upsetting operation.

Referring now to Fig. 2, I have provided a preferred form of puller for use in applying the rivet. This device comprises a tool body formed as a cylindrical casing 14 internally threaded as at 15 to receive a screw actuator 16. The inner end of the actuator is provided with a suitable chuck 17 for gripping the outer serrated end of the forming stem 9. The chuck jaws are yieldably held contracted by means of a spring-pressed plunger 19 cooperating with a contracting cone 17a. The actuator 16 may be rotated in any suitable way as by means of a squared shaft 20 operated either manually or by a suitable source of power. The forward end of the casing or body 14 has a cap 21 apertured for the passage of the forming stem 9, and when the actuator is advanced to the front end of the casing the chuck jaws engage with the cap and are forced rearwardly in the actuating cone 17a to permit of insertion and removal of the forming stem. The cap 21 also has formed integral therewith a concave recess 22 shaped to form a seat for the head 8.

In applying the rivet, the serrated end 11 of the forming stem is inserted into the chuck 17 of the puller. The rivet assembly is then inserted through the alined holes 12 in the parts A and B, and with the concave nose 22 of the tool engaging with the head 8, a rotary motion is imparted to the shaft 20. As the screw 16 is turned, the end portion 11 of the forming stem is gripped by the jaws of the chuck 17 which are coincidentally forced by the contracting cone 17a tightly into firm gripping engagement with the stem. A combined rotational and axial force is thus imparted to the forming stem and as the latter is drawn through the tubular shank, the head 10 thereof is forced axially and simultaneously rotated so as to upset the inner end of the tubular rivet shank with a rolling motion. Coincidentally, the threaded portion 13 of the stem, being of an external diameter somewhat larger than the internal diameter of the shank, forces the latter radially outward into engagement with the edges of the holes 12 while at the same time exerting a binding action between the forming stem and the tubular rivet. The axial movement of the forming stem through the tubular shank is facilitated by the fact that the pitch of the threads 15 corresponds to the pitch of the threaded portion 13. Finally, a reverse rotation is imparted to the driving member 20 to permit the chuck 17 to be disengaged from the serrated end portion 11 of the stem 9.

In the embodiment of the invention illustrated in Figs. 3 and 4, the construction and method of applying the rivet is substantially similar to that above described. In this instance, however, the outer end portion of the forming stem is bent at right angles, as indicated at 24, for insertion into an open-ended socket 25, extending radially outward from the axis of an actuator member 26. The latter is slidable axially within a casing 27 having at its forward end a concave nose portion 28 for receiving the head 8 of the tubular rivet. As in the case of the pulling device of Fig. 2, a combined rotational and axial force is applied to the actuator 26. Upon the completion of the setting operation, the bent end portion 24 of the forming stem is sheared off as indicated at 29. Rupture of the forming stem at the end of the riveting operation is desirable in that it provides a definite indication to the operator that the rivet has been headed; and provision for such rupture by a shearing action has been found to be advantageous because it permits of an accurate determination of the amount of force necessary to be applied to insure best results. It will be understood that the bent end portion 24 facilitates chucking of the forming stem both for purposes of axial as well as rotational movement.

While I have shown and described the preferred embodiment of my invention, I do not desire to be limited to any of the details of construction shown and described herein, except as defined in the appended claims.

I claim:

1. In an apparatus for setting blind rivets of the type including a rivet body having a shank adapted to be extended through an aperture into which the rivet is to be set, and a stem having an upsetting head at one of its ends and radially extending helical threads on the stem to threadedly engage the interior of the shank, which comprises a tool body member, an actuator member movable within said tool body toward and away from one end of said tool body, means on the end of said tool body for engaging the rivet head when the stem is inserted into said tool body, means on said actuator for engaging the inserted end of the rivet stem, and means for moving the actuator relative to said body with a combined axial and rotary motion.

2. In an apparatus for setting blind rivets of the type including a rivet body having a shank adapted to be extended through an aperture into which the rivet is to be set, and a stem having an upsetting head at one of its ends and radially extending helical threads on the stem to threadedly engage the interior of the shank, which comprises a tool body member, an actuator member movable within said tool body toward and away from one end of said tool body, means on the end of said tool body for engaging the rivet head when the stem is inserted into said tool body, means on said actuator for engaging the inserted end of the rivet stem, and means for moving the actuator relative to said body with a combined axial and rotary motion, the relation between the axial and rotary motions of said actuator and tool body corresponding to the pitch of the threads on said rivet stem.

3. In an apparatus for setting blind rivets of the type including a rivet body having a shank adapted to be extended through an aperture into which the rivet is to be set, and a stem having an upsetting head at one of its ends and radially extending helical threads on the stem to threadedly engage the interior of the shank, which comprises a tool body member, an actuator member movable within said tool body toward and away from one end of said tool body, means on the end of said tool body for engaging the rivet head when the stem is inserted into said tool body, means on said actuator for engaging the inserted end of the rivet stem, means threadedly interconnecting said actuator and said tool body having a pitch corresponding to the pitch of the threads on said rivet stem whereby relative rotary motion imparted between said tool body and said actuator will impart an axial movement and a rotational movement to said rivet stem to cause the threads on said stem to cut corresponding threads in the shank of the rivet body.

ERNEST H. SHAFF.